US011988990B2

(12) United States Patent
Okabe et al.

(10) Patent No.: US 11,988,990 B2
(45) Date of Patent: May 21, 2024

(54) IMAGE-FORMING APPARATUS PROVIDED WITH FIRST SENSOR DETECTING TEMPERATURE AND HUMIDITY AND SECOND SENSOR DISPOSED SEPARATELY FROM THE FIRST SENSOR AND DETECTING TEMPERATURE

(71) Applicant: BROTHER KOGYO KABUSHIKI KAISHA, Nagoya (JP)

(72) Inventors: Yusuke Okabe, Nagoya (JP); Tetsuharu Ube, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/189,664

(22) Filed: Mar. 24, 2023

(65) Prior Publication Data

US 2023/0315011 A1 Oct. 5, 2023

(30) Foreign Application Priority Data

Apr. 1, 2022 (JP) ................................ 2022-061544

(51) Int. Cl.
*G03G 15/00* (2006.01)
*G03G 15/20* (2006.01)
*G03G 21/20* (2006.01)

(52) U.S. Cl.
CPC ....... *G03G 21/206* (2013.01); *G03G 15/2017* (2013.01); *G03G 21/203* (2013.01); *G03G 2221/1645* (2013.01)

(58) Field of Classification Search
CPC . G03G 15/2017; G03G 21/203; G03G 21/206
USPC ........................................................... 399/44
See application file for complete search history.

(56) References Cited

U.S. PATENT DOCUMENTS

2016/0231689 A1* 8/2016 Tomita ............... G03G 21/0005
2022/0082965 A1* 3/2022 An ....................... G03G 15/162

FOREIGN PATENT DOCUMENTS

JP 2000-187404 A 7/2000
JP 2005-345540 A 12/2005
JP 2009-58756 A 3/2009

* cited by examiner

*Primary Examiner* — Hoan H Tran
(74) *Attorney, Agent, or Firm* — Merchant & Gould P.C.

(57) ABSTRACT

In an image-forming apparatus, a first sensor measures a first temperature and a relative humidity. A second sensor measures a second temperature. A controller is configured to perform: (a) calculating; (b) determining; and (c) executing. The (a) calculating calculates an internal temperature on the basis of the second temperature. The (a) calculating includes: when a target temperature of a heater is set to a printing temperature: (a-1) determining; and (a-2) correcting. The (a-2) correcting corrects, in response to determining in (a-1) that a temperature increase in the first temperature is greater than or equal to a first prescribed value and a humidity increase in an absolute humidity is greater than or equal to a second prescribed value, the internal temperature. The (c) executing executes, in response to determining in (b) that the internal temperature is greater than a threshold, a cool-down process to reduce a temperature inside a main casing.

6 Claims, 5 Drawing Sheets

IMAGE-FORMING APPARATUS PROVIDED WITH FIRST SENSOR DETECTING TEMPERATURE AND HUMIDITY AND SECOND SENSOR DISPOSED SEPARATELY FROM THE FIRST SENSOR AND DETECTING TEMPERATURE

REFERENCE TO RELATED APPLICATIONS

This application claims priority from Japanese Patent Application No. 2022-061544 filed on Apr. 1, 2022. The entire content of the priority application is incorporated herein by reference.

BACKGROUND ART

Conventionally, an image-forming apparatus has been provided with an internal temperature sensor and an ambient temperature sensor. When the difference between detection results from the internal temperature sensor and detection results from the ambient temperature sensor is greater than or equal to a prescribed temperature, the image-forming apparatus reports that the installation location of the image-forming apparatus is inappropriate.

DESCRIPTION

However, even when installed in a suitable location, the conventional image-forming apparatus may erroneously determine that the installation location is inappropriate if the temperature around the device were to change due to the effects of air conditioning or the like.

In view of the foregoing, it is an object of the present disclosure to provide an image-forming apparatus capable of accurately detecting whether the installation location of the device is inappropriate.

In order to attain the above and other object, according to one aspect, the present disclosure provides an image-forming apparatus including: a main casing; a photosensitive drum; a developing roller; a heater; a first sensor; a second sensor; and a controller. The main casing includes: a first side wall; and a second side wall. The first side wall has an exhaust port. The second side wall is disposed on an opposite side of the first side wall in a prescribed direction. The developing roller is configured to supply toner to the photosensitive drum. The heater is configured to apply heat to a sheet to which toner is transferred from the photosensitive drum to fix the transferred toner to the sheet. The first sensor is disposed near the first side wall on the same side as the exhaust port with respect to the first side wall and is separated from the exhaust port. The first sensor is configured to measure a first temperature and a relative humidity. The second sensor is disposed near the second side wall and is separated from the heater. The second sensor is configured to measure a second temperature. The controller is configured to perform: (a) calculating; (b) determining; and (c) executing. The calculating in (a) calculates an internal temperature on the basis of the second temperature. The internal temperature is an estimated value of a temperature near the developing roller. The calculating includes: when a target temperature of the is set to a printing temperature: (a-1) determining; and (a-2) correcting. The determining in (a-1) determines whether a temperature increase in the first temperature is greater than or equal to a first prescribed value and a humidity increase in an absolute humidity is greater than or equal to a second prescribed value. The temperature increase in the first temperature indicates an amount of increase in a current first temperature relative to a previous first temperature. The current first temperature is the first temperature last measured by the first sensor. The previous first temperature is the first temperature measured by the first sensor a prescribed time before the current first temperature is measured. The absolute humidity is calculated on the basis of the relative humidity. The humidity increase in the absolute humidity indicates an amount of increase in a current absolute humidity relative to a previous absolute humidity. The current absolute humidity is based on a current relative humidity. The previous absolute humidity is based on a previous relative humidity. The current relative humidity is the relative humidity last measured by the first sensor. The previous relative humidity is the relative humidity measured by the first sensor the previous time before the timing at which the current relative humidity is measured. The correcting in (a-2) corrects, in response to determining in (a-1) that the temperature increase in the first temperature is greater than or equal to the first prescribed value and the humidity increase in the absolute humidity is greater than or equal to the second prescribed value, the internal temperature. The determining in (b) determines whether the internal temperature is greater than a first threshold. The executing in (c) executes, in response to determining in (b) that the internal temperature is greater than the first threshold, a cool-down process to reduce a temperature inside the main casing.

In the above structure, the image-forming apparatus corrects the estimated value of the temperature near the developing roller based on not only the temperature increase in the first temperature over the prescribed time but also the humidity increase in the absolute humidity over the prescribed time.

In a case where a printing process is being executed, moisture in a sheet is evaporated when the sheet is heated by the heater.

Therefore, in a case where the image-forming apparatus is installed in an inappropriate location, moisture in the main casing is not exhausted from the main casing and may cause the absolute humidity in the main casing to increase excessively.

When the image-forming apparatus is installed in an appropriate location, on the other hand, moisture in the main casing is properly exhausted from the main casing, thereby suppressing an increase in the absolute humidity in the main casing.

Therefore, in a case where the installation location of the image-forming apparatus is appropriate and the ambient temperature near the image-forming apparatus has increased due to an air conditioner or the like, the humidity increase in the absolute humidity within the main casing will be less than the second prescribed value.

As a result, the controller can accurately detect whether the installation location of the image-forming apparatus is appropriate.

1. OVERVIEW OF AN IMAGE-FORMING APPARATUS 1

Figure 1:
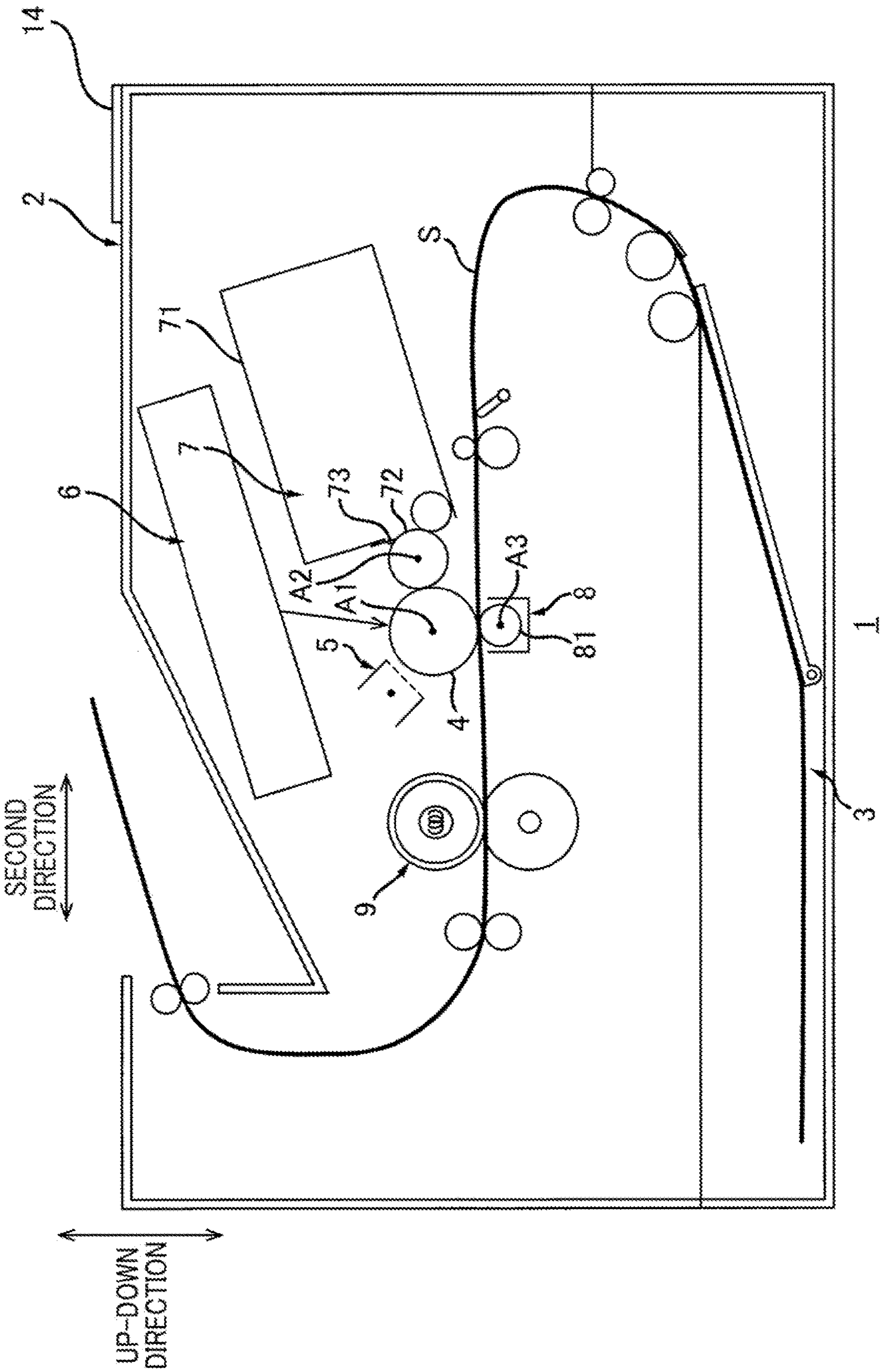
FIG. 1 is a schematic diagram illustrating the configuration of an image-forming apparatus.

An overview of an image-forming apparatus 1 will be described with reference to FIG. 1.

The image-forming apparatus 1 is provided with a main casing 2, a sheet accommodating unit 3, a photosensitive drum 4, a charging device 5, an exposure device 6, a developing cartridge 7, a transfer device 8, and a fixing device 9.

1.1 Main Casing 2

The main casing 2 accommodates the sheet accommodating unit 3, photosensitive drum 4, charging device 5, exposure device 6, developing cartridge 7, transfer device 8, and fixing device 9.

1.2 Sheet Accommodating Unit 3

The sheet accommodating unit 3 can accommodate sheets S. The sheets S are sheets of printing paper, for example. The sheets S are conveyed from the sheet accommodating unit 3 toward the photosensitive drum 4.

1.3 Photosensitive Drum 4

The photosensitive drum 4 has a cylindrical shape. The photosensitive drum 4 extends in a first direction (see FIG. 2). The photosensitive drum 4 is rotatable about an axis A1. The axis A1 is aligned in the first direction.

1.4 Charging Device 5

The charging device 5 electrically charges the surface of the photosensitive drum 4. The charging device 5 is a scorotron charger. Alternatively, the charging device 5 may be a charging roller.

1.5 Exposure Device 6

The exposure device 6 exposes the surface of the photosensitive drum 4 that has been charged by the charging device 5. The exposure device 6 is a laser scanning unit. Alternatively, the exposure device 6 may be an LED array.

1.6 Developing Cartridge 7

The developing cartridge 7 can be mounted inside the main casing 2. The developing cartridge 7 supplies toner onto the photosensitive drum 4. Specifically, the developing cartridge 7 supplies toner onto the surface of the photosensitive drum 4 after the surface has been exposed by the exposure device 6. The developing cartridge 7 has a developing housing 71, a developing roller 72, and a thickness regulating blade 73. In other words, the image-forming apparatus 1 has a developing roller 72.

The developing housing 71 can accommodate toner.

The developing roller 72 can supply toner from the developing housing 71 onto the surface of the photosensitive drum 4. The developing roller 72 is in contact with the photosensitive drum 4. The developing roller 72 may also be separated from the photosensitive drum 4 by a prescribed distance. The developing roller 72 has a cylindrical shape. The developing roller 72 extends in the first direction. The developing roller 72 is rotatable about an axis A2. The axis A2 is aligned in the first direction.

The thickness regulating blade 73 regulates the thickness of toner carried on the developing roller 72. When the temperature of the thickness regulating blade 73 rises excessively, toner on the developing roller 72 may melt due to the heat from the thickness regulating blade 73, causing toner to adhere to the thickness regulating blade 73. When the amount of toner adhering to the thickness regulating blade 73 becomes excessive, irregularities may appear in the printed images. Therefore, it is necessary to regulate the temperature of the thickness regulating blade 73.

1.7 Transfer Device 8

The transfer device 8 transfers toner from the photosensitive drum 4 onto sheets S. In the present embodiment, the transfer device 8 has a transfer roller 81.

The transfer roller 81 is in contact with the photosensitive drum 4. The transfer roller 81 may also be separated from the photosensitive drum 4 by a prescribed distance. Sheets S in the sheet accommodating unit 3 are conveyed between the photosensitive drum 4 and transfer roller 81 toward the fixing device 9. The transfer roller 81 transfers toner from the photosensitive drum 4 onto a sheet S as the sheet S passes between the photosensitive drum 4 and the transfer roller 81. The transfer roller 81 has a cylindrical shape. The transfer roller 81 extends in the first direction. The transfer roller 81 is rotatable about an axis A3. The axis A3 is aligned in the first direction. Alternatively, the transfer device 8 may be configured with a transfer belt.

1.8 Fixing Device 9

The fixing device 9 applies heat and pressure to a sheet S after toner has been transferred to the sheet S from the photosensitive drum 4. The fixing device 9 fixes the toner to the sheet S with heat. After passing through the fixing device 9, the sheet S is discharged onto the top surface of the main casing 2.

2. DETAILED DESCRIPTION OF THE IMAGE-FORMING APPARATUS 1

Next, the image-forming apparatus 1 will be described in greater detail with reference to FIGS. 2 and 3.

Figure 2:
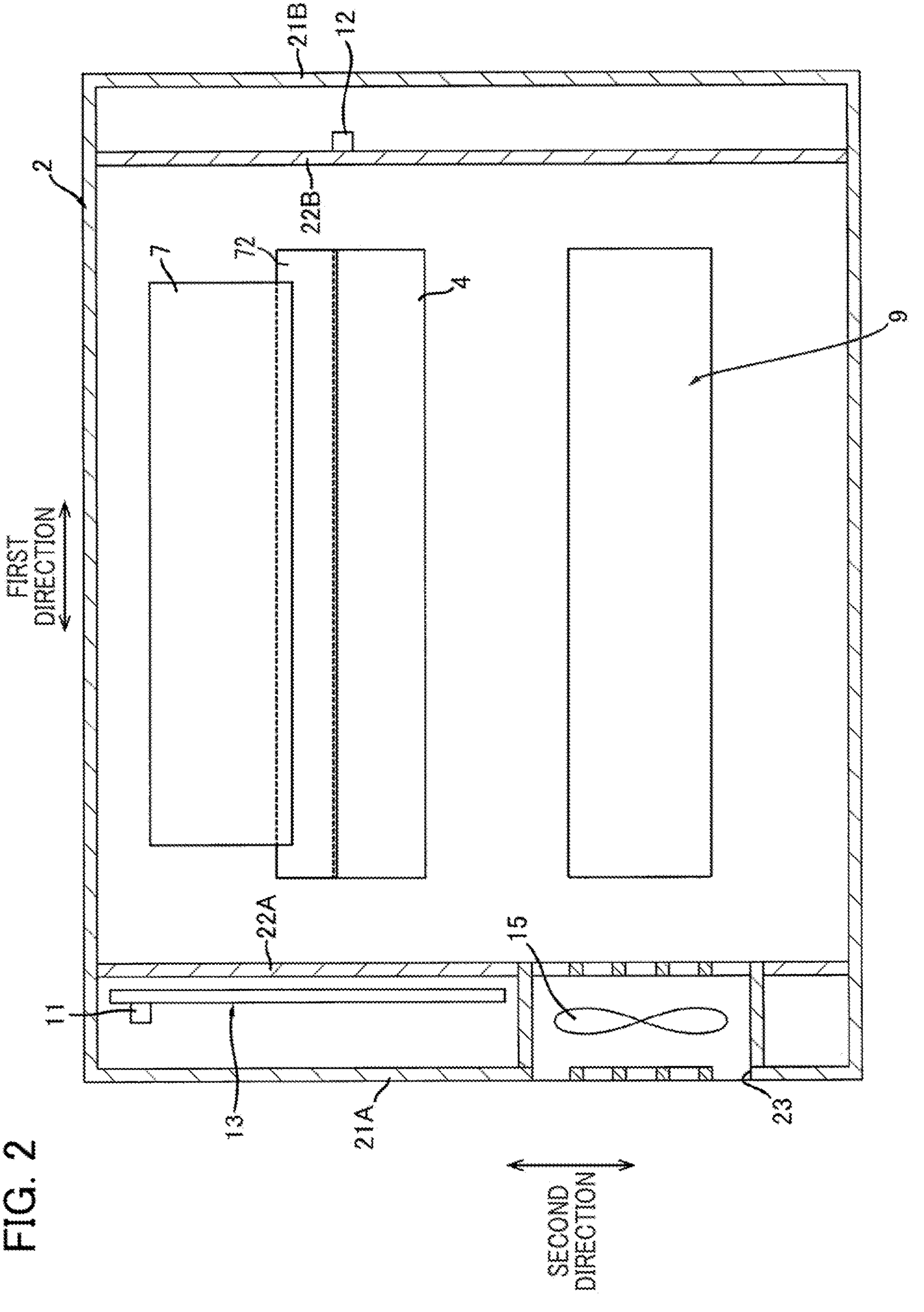
FIG. 2 is an explanatory view illustrating the arrangement of a fixing device, a first sensor, a second sensor, a fan, and a control unit in the image-forming apparatus illustrated in FIG. 1.

As illustrated in FIG. 2, the image-forming apparatus 1 is provided with a first sensor 11, a second sensor 12, a control unit 13, a display unit 14 (see FIG. 1), and a fan 15.

2.1 Detailed Description of the Main Casing 2

The main casing 2 has two side walls 21A and 21B, and two inner walls 22A and 22B.

The side wall 21A is an outer wall of the main casing 2 on one side in the first direction. That is, the side wall 21A is located on one end portion of the main casing 2 in the first direction. The side wall 21A extends in the up-down direction and a second direction. The second direction crosses both the first direction and the up-down direction. More specifically, the second direction is orthogonal to the first direction and the up-down direction. The side wall 21A has an exhaust port 23.

The side wall 21B is an outer wall of the main casing 2 on the other side of the first direction. That is, the side wall 21B is located on the other end portion of the main casing 2 in the first direction. Hence, the side wall 21B is disposed on the opposite side of the side wall 21A in the first direction, and is separated from the side wall 21A in the first direction. The side wall 21B extends in the up-down direction and in the second direction.

The inner wall 22A is positioned between the side wall 21A and side wall 21B in the first direction. The inner wall 22A is separated from the side wall 21A in the first direction. The inner wall 22A extends in the up-down direction and in the second direction.

The inner wall 22B is positioned between the inner wall 22A and side wall 21B in the first direction. The inner wall 22B is separated from the inner wall 22A in the first direction. The inner wall 22B extends in the up-down direction and in the second direction. The photosensitive drum 4, developing cartridge 7, and fixing device 9 are located between the inner wall 22A and inner wall 22B in the first direction.

2.2 First Sensor 11

The first sensor 11 is positioned near the side wall 21A of the main casing 2 in the first direction. The first sensor 11 is disposed between the side wall 21A and inner wall 22A in the first direction. The first sensor 11 is separated from the fixing device 9 in the second direction. Specifically, the first sensor 11 is positioned on the opposite side of the photosensitive drum 4 from the fixing device 9 in the second direction. The first sensor 11 is also separated from the exhaust port 23 in the second direction. Specifically, the first sensor 11 is positioned on the opposite side of the photosensitive drum 4 from the exhaust port 23. The first sensor 11 can measure a first temperature and the relative humidity.

2.3 Second Sensor 12

The second sensor 12 is positioned near the side wall 21B of the main casing 2 in the first direction. The second sensor 12 is disposed between the side wall 21B and inner wall 22B in the first direction. The second sensor 12 is separated from the fixing device 9 in the second direction. The second sensor 12 is at the same position as the developing roller 72 in the second direction. The second sensor 12 can measure a second temperature. The second temperature differs from the temperature of the thickness regulating blade 73, which is in proximity to or in contact with the developing roller 72.

2.4 Control Unit 13

Figure 3:
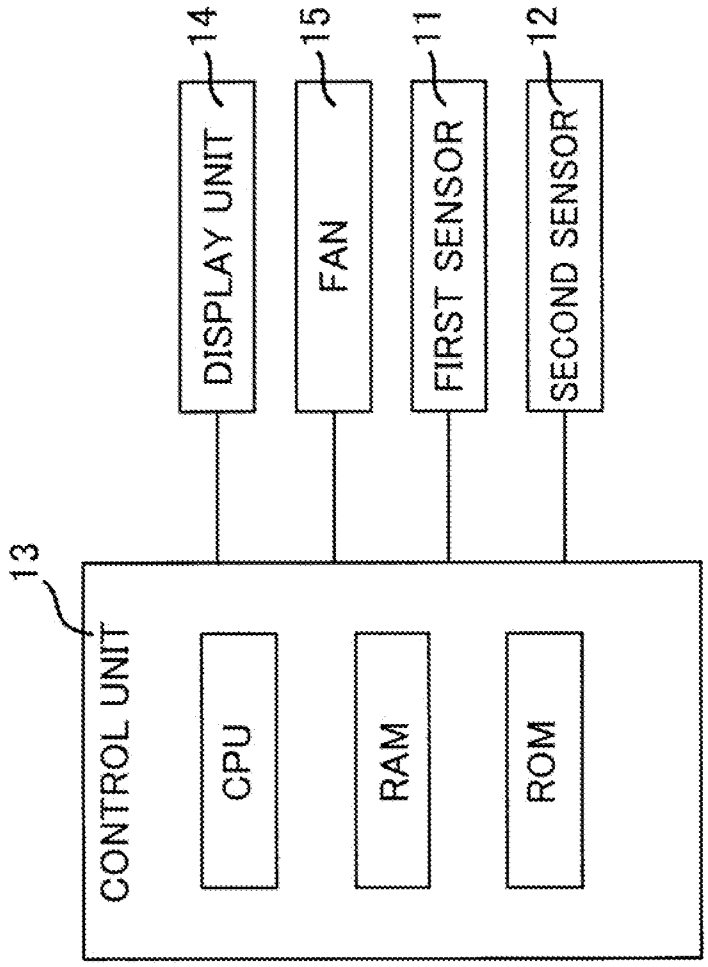
FIG. 3 is a block diagram illustrating the control of the image-forming apparatus illustrated in FIG. 1.

As illustrated in FIG. 3, the control unit 13 is electrically connected to the first sensor 11, second sensor 12, display unit 14, and fan 15. The control unit 13 is a circuit board having a processor and memory. As illustrated in FIG. 2, the control unit 13 is located between the side wall 21A and inner wall 22A in the first direction. The processor of the control unit 13 is a CPU, for example. The memory may be volatile or nonvolatile memory. For example, the memory may be RAM or ROM.

2.5 Display Unit 14

As illustrated in FIG. 1, the display unit 14 is disposed on the top surface of the main casing 2. The display unit 14 is the display of a control panel on the image-forming apparatus 1, for example.

2.6 Fan 15

As illustrated in FIG. 2, the fan 15 generates airflow within the main casing 2 toward the exhaust port 23. The fan 15 is positioned near the side wall 21A of the main casing 2 in the first direction. The fan 15 is disposed between the side wall 21A and fixing device 9 in the first direction.

3. CONTROL OF THE IMAGE-FORMING APPARATUS 1

Next, control of the image-forming apparatus 1 will be described with reference to FIGS. 4 and 5.

When the image-forming apparatus 1 is installed in an inappropriate location, the control unit 13 increases the frequency of a cool-down process. One case of the image-forming apparatus 1 being installed inappropriately is when the exhaust port 23 faces a wall.

In the cool-down process, the control unit 13 halts the supply of power to the fixing device 9 and reduces the temperature inside the main casing 2 by setting the target temperature of the fixing device 9 lower than a setting value for printing (hereinafter referred to as "printing temperature") and preventing the next sheet S from being fed, for example.

Figure 4:
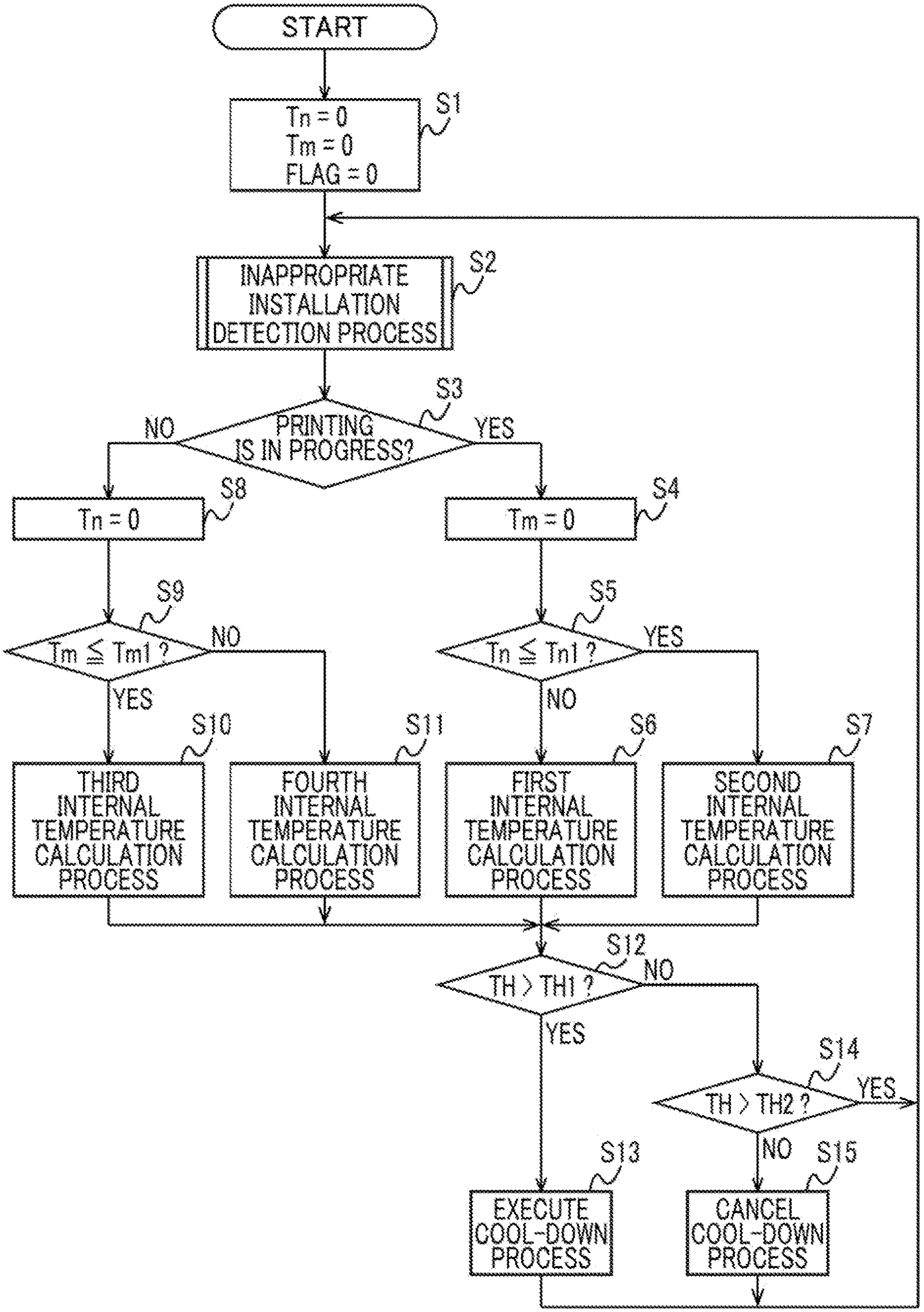
FIG. 4 is a flowchart illustrating steps in a control process of the image-forming apparatus.

When the image-forming apparatus 1 enters an operating state, in S1 of FIG. 4 the control unit 13 first resets an elapsed time Tn for indicating the time that elapses after the target temperature of the fixing device 9 is set to the printing temperature, an elapsed time Tm indicating the time that elapses after the target temperature of the fixing device 9 is no longer set to the printing temperature, and a flag indicating whether the installation location of the image-forming apparatus 1 is inappropriate. The value of the flag is "1" when the installation location of the image-forming apparatus 1 is inappropriate and "0" when the installation location is suitable/appropriate. Resetting the flag means that the flag is set to "0".

Next, the control unit 13 executes an inappropriate installation detection process in S2. The inappropriate installation detection process is performed for detecting whether the installation location of the image-forming apparatus 1 is inappropriate.

3.1 Inappropriate Installation Detection Process

Figure 5:
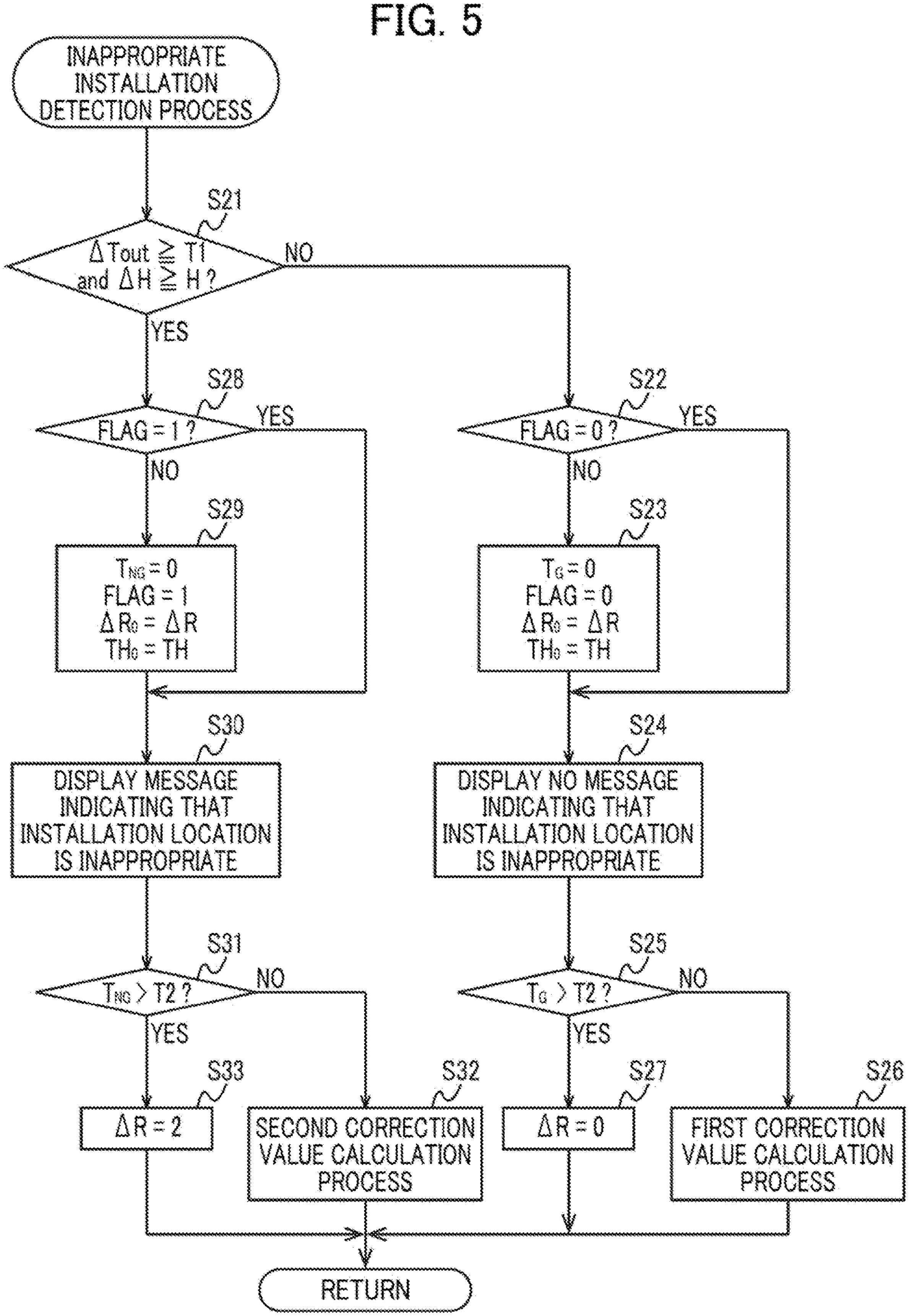
FIG. 5 is a flowchart illustrating steps in an inappropriate installation detection process performed in the control process illustrated in FIG. 4.

In S21 at the beginning of FIG. 5, the control unit 13 determines whether the installation location of the image-forming apparatus 1 is inappropriate on the basis of an increase $\Delta T_{out}$ in the first temperature and an increase ΔH in the absolute humidity. The control unit 13 calculates the absolute humidity from the relative humidity measured by the first sensor 11.

Here, the increase $\Delta T_{out}$ in the first temperature indicates an amount of increase in a current first temperature relative to a previous first temperature. The current first temperature is a first temperature last measured by the first sensor 11. The previous first temperature is a first temperature measured by the first sensor 11 a first time before the timing at which the current first temperature is measured. The increase ΔH in the absolute humidity indicates an amount of increase in a current absolute humidity relative to a previous absolute humidity. The current absolute humidity is an absolute humidity based on the current relative humidity last measured by the first sensor 11. The previous absolute humidity is an absolute humidity based on a previous relative humidity measured by the first sensor 11 the first time before the timing at which the current relative humidity is measured.

When the increase $\Delta T_{out}$ is less than a first prescribed value T1 or the increase ΔH is less than a second prescribed value H (S21: NO), the control unit 13 determines that the installation location of the image-forming apparatus 1 is appropriate.

However, when the increase $\Delta T_{out}$ is greater than or equal to the first prescribed value T1 and the increase ΔH is greater than or equal to the second prescribed value H (S21: YES), the control unit 13 determines that the installation location of the image-forming apparatus 1 is inappropriate.

The first time is 1500 seconds, for example. The first prescribed value T1 is 4° C., for example. The second prescribed value H is 2 g/cm$^3$, for example.

3.1.1 When the Installation Location is Appropriate

When the control unit 13 determines that the installation location of the image-forming apparatus 1 is appropriate (S21: NO), in S22 the control unit 13 checks whether the flag is "0".

When the flag is "1" (S22: NO), in S23 the control unit 13 sets the flag to "0".

After changing the flag from "1" to "0", in S23 the control unit 13 also sets an elapsed time $T_G$ to "0" and begins measuring the elapsed time $T_G$. The control unit 13 also stores a correction value ΔR at the timing of executing the process in S23 as the correction value $\Delta R_0$ immediately before the flag is changed. The control unit 13 also stores an internal temperature TH at the timing of executing the process in S23 as the internal temperature $TH_0$ immediately before the flag is changed. The correction value ΔR is calculated in a subsequent process S26, S27, S32, or S33. Further, the internal temperature TH is calculated in a subsequent process S6, S7, S12, or S13.

On the other hand, the control unit 13 skips the process in S23 when the flag is "0" (S22: YES).

In S24 the control unit 13 removes a displayed message indicating that the installation location of the image-forming apparatus 1 is inappropriate. That is, when a message indicating that the image-forming apparatus 1 is installed in an inappropriate location is currently displayed on the display unit 14 (the case of S22: NO), the control unit 13 removes this message. However, if no such message is displayed on the display unit 14 (the case of S22: YES), the control unit 13 takes no further action.

Thereafter, the control unit 13 calculates the correction value ΔR. The correction value ΔR is used for calculating the internal temperature TH described later.

While the elapsed time $T_G$ is no greater than a prescribed time T2 (S25: NO), the control unit 13 executes a first correction value calculation process in S26.

The prescribed time T2 is 20 seconds, for example.

In the first correction value calculation process, the control unit 13 calculates the correction value ΔR using the following formula (1).

$$\text{Correction value } \Delta R = \text{correction value } \Delta R_0 \times (1 - \text{elapsed time } T_G / \text{prescribed time } T2) \quad \text{Formula (1):}$$

In other words, the correction value ΔR changes at regular intervals.

However, when the elapsed time $T_G$ exceeds the prescribed time T2 (S25: YES), in S27 the control unit 13 sets the correction value ΔR to "0".

After completing the process for calculating and setting the correction value ΔR of S26 or S27, the control unit 13 ends the inappropriate installation detection process of S2.

3.1.2 When the Installation Location is Inappropriate

When the control unit 13 determines that the installation location of the image-forming apparatus 1 is inappropriate (S21: YES), in S28 the control unit 13 confirms whether the flag is "1".

If the flag is "0" (S28: NO), in S29 the control unit 13 sets the flag to "1".

Further, after changing the flag from "0" to "1", in S29 the control unit 13 also sets an elapsed time $T_{NG}$ to "0" and begins measuring the elapsed time $T_{NG}$. In S29 the control unit 13 also stores the correction value ΔR at the timing of executing the process in S29 as the correction value $\Delta R_0$ immediately before the flag is changed. In S29 the control unit 13 also stores the internal temperature TH at the timing of executing the process in S29 as the internal temperature $TH_0$ immediately before the flag is changed.

On the other hand, when the flag is "1" (S28: YES), the control unit 13 skips the process in S29.

In S30 the control unit 13 displays a message indicating that the installation location of the image-forming apparatus 1 is inappropriate. Thus, when the current first temperature has increased by the first prescribed value T1 or greater compared to the previous first temperature the first time ago and the current absolute humidity has increased by the second prescribed value H or greater compared to the previous absolute humidity the first time ago (S21: YES), the control unit 13 displays a message on the display unit 14 indicating that the installation location of the image-forming apparatus 1 is inappropriate. Here, the control unit 13 may also display a message on the display unit 14 indicating that the length of time before executing a cool-down process will be shortened.

Specifically, when a message indicating that the installation location of the image-forming apparatus 1 is inappropriate is not currently displayed on the display unit 14 (the case of S28: NO), the control unit 13 displays a message on the display unit 14 indicating that the installation location of the image-forming apparatus 1 is inappropriate. However, when a message indicating the installation location is inappropriate is already displayed on the display unit 14 (the case of S28: YES), the control unit 13 simply maintains that display.

Thereafter, the control unit 13 calculates the correction value ΔR.

When the elapsed time $T_{NG}$ is less than or equal to the prescribed time T2 (S31: NO), the control unit 13 executes a second correction value calculation process in S32.

In the second correction value calculation process, the control unit 13 calculates the correction value ΔR according to the following formula (2).

$$\text{Correction value } \Delta R = 2 \times (\text{elapsed time } T_{NG} / \text{prescribed time } T2) + \text{correction value } \Delta R_0 \times (1 - \text{elapsed time } T_{NG} / \text{prescribed time } T2) \quad \text{Formula (2):}$$

On the other hand, when the elapsed time $T_{NG}$ exceeds the prescribed time T2 (S31: YES), in S33 the control unit 13 sets the correction value ΔR to "2".

After completing the process for calculating and setting the correction value ΔR, the control unit 13 ends the inappropriate installation detection process of S2.

3.2 Calculation of the Internal Temperature TH

Next, returning to the process of FIG. 4, the control unit 13 corrects the internal temperature TH based on the correction value ΔR that has been calculated in the inappropriate installation detection process of S2. The internal temperature TH is the estimated temperature of the thickness regulating blade 73 near the developing roller 72. The internal temperature TH is calculated on the basis of the second temperature measured by the second sensor 12.

When the target temperature of the fixing device 9 is set to the printing temperature, i.e., when printing is in progress (S3: YES), in S4 the control unit 13 sets the elapsed time Tm since the target temperature of the fixing device 9 is no longer set to the printing temperature to "0". In S5 the control unit 13 determines whether the elapsed time Tn since the target temperature of the fixing device 9 is set to the printing temperature is no greater than a prescribed time Tn1. When the elapsed time Tn is greater than the prescribed time Tn1 (S5: NO), the control unit 13 executes a first internal temperature calculation process in S6.

The prescribed time Tn1 is 20 seconds, for example.

In the first internal temperature calculation process of S6, the control unit 13 corrects the internal temperature TH according to the following formula (A). Thus, when the target temperature of the fixing device 9 is set to the printing temperature (S3: YES) and the current first temperature has risen by the first prescribed value T1 or greater compared to the previous first temperature the first time ago while the current absolute humidity has increased by the second prescribed value H or greater compared to the previous absolute humidity the first time ago (S21: YES), the control unit 13 corrects the internal temperature TH according to the formula (A).

$$\text{Internal temperature } TH = a \times \log(\text{second temperature})^2 + b \times \log(\text{second temperature}) + c + \text{correction value } \Delta R \quad \text{Formula (A):}$$

In the above formula (A), "a×log(second temperature)$^2$+b×log(second temperature)+c" indicates the uncorrected internal temperature TH. An internal temperature TH not subjected to correction has been calculated on the basis of the second temperature. Thus, in the correction process the control unit 13 adds the correction value ΔR, which changes at regular intervals, to the uncorrected internal temperature TH. In this way, in the correction process the control unit 13 sets the internal temperature TH higher than the value calculated on the basis of the second temperature. Note that a, b, and c are coefficients found through multiple regression analysis of experimental results.

However, when the elapsed time Tn is less than or equal to the prescribed time Tn1 (S5: YES), the control unit 13 executes a second internal temperature calculation process in S7.

In the second internal temperature calculation process of S7, the control unit 13 corrects the internal temperature TH according to the following formula (B).

$$\text{Internal temperature } TH=\{a\times\log(\text{second temperature})^2+b\times\log(\text{second temperature})+c+\text{correction value } \Delta R\}\times Tn\div Tn1+TH_0\times(Tn1-Tn)\div Tn1 \quad \text{Formula (B):}$$

Further, when the target temperature of the fixing device 9 is not set to the printing temperature, i.e., when printing is not in progress (S3: NO), in S8 the control unit 13 sets the elapsed time Tn since the target temperature of the fixing device 9 is set to the printing temperature to "0". In S9 the control unit 13 determines whether the elapsed time Tm since the target temperature of the fixing device 9 is no longer set to the printing temperature is less than or equal to a prescribed time Tm1. When the elapsed time Tm is less than or equal to the prescribed time Tm1 (S9: YES), the control unit 13 executes a third internal temperature calculation process in S10.

The prescribed time Tm1 is 400 seconds, for example.

In the third internal temperature calculation process of S10, the control unit 13 calculates the internal temperature TH according to the following formula (C). The control unit 13 does not use the correction value ΔR to correct the internal temperature TH in the third internal temperature calculation process of S10 and a fourth internal temperature calculation process of S11 described later.

$$\text{Internal temperature } TH=TH_0\times(Tm1-Tm)\div Tm1+\text{second temperature}\times Tm\div Tm1 \quad \text{Formula (C):}$$

On the other hand, when the elapsed time Tm is greater than the prescribed time Tm1 (S9: NO), the control unit 13 executes the fourth internal temperature calculation process in S11.

In the fourth internal temperature calculation process of S11, the control unit 13 calculates the internal temperature TH according to the following formula (D).

$$\text{Internal temperature } TH=\text{second temperature} \quad \text{Formula (D):}$$

3.3 Cool-Down Process

In S12 the control unit 13 determines whether the internal temperature TH calculated above in S10, S11, S6 or S7 exceeds a first threshold value TH1. When the internal temperature TH is greater than the first threshold value TH1 (S12: YES), in S13 the control unit 13 executes a cool-down process and subsequently repeats the inappropriate installation detection process in S2.

The first threshold value TH1 is 42° C., for example.

However, when the internal temperature TH calculated above is less than or equal to the first threshold value TH1 (S12: NO), in S14 the control unit 13 determines whether the internal temperature TH is greater than a second threshold value TH2. When the internal temperature TH is less than or equal to the second threshold value TH2 (S14: NO), in S15 the control unit 13 cancels the cool-down process and subsequently repeats the inappropriate installation detection process in S2.

The second threshold value TH2 is lower than the first threshold value TH1. For example, the second threshold value TH2 is 41° C.

On the other hand, when the internal temperature TH calculated above is less than or equal to the first threshold value TH1 but greater than the second threshold value TH2 (S12: NO, S14: YES), the control unit 13 maintains the cool-down process and repeats the inappropriate installation detection process of S2.

Thus, in the cool-down process of S13, the control unit 13 changes the target temperature for the fixing device 9 to a value less than the printing temperature and maintains this target temperature until the internal temperature TH falls below the second threshold value TH2.

4. OPERATIONS AND EFFECTS (1) The image-forming apparatus 1 according to the embodiment described above corrects the internal temperature TH (S6, S7) based on not only an increase $\Delta T_{out}$ in the first temperature over the first time but also an increase ΔH in the absolute humidity over the first time, as illustrated in FIG. 5.

When executing a printing process, moisture in a sheet S is evaporated when the sheet S is heated in the fixing device 9.

Therefore, in a case where the image-forming apparatus 1 is installed in an inappropriate location with the exhaust port 23 facing a wall, for example, moisture in the main casing 2 is not exhausted from the main casing 2 through the exhaust port 23 and may cause the absolute humidity in the main casing 2 to increase excessively.

When the image-forming apparatus 1 is installed in an appropriate location, on the other hand, moisture in the main casing 2 is properly exhausted through the exhaust port 23, thereby suppressing an increase in the absolute humidity in the main casing 2.

Therefore, in a case where the installation location of the image-forming apparatus 1 is appropriate and the ambient temperature near the image-forming apparatus 1 has increased due to an air conditioner or the like, the increase ΔH in the absolute humidity within the main casing 2 will be less than the second prescribed value H.

As a result, the control unit 13 can accurately detect whether the installation location of the image-forming apparatus 1 is appropriate.

(2) According to the image-forming apparatus 1 of the embodiment, the control unit 13 lowers the target temperature of the fixing device 9 in the cool-down process (S13) until the internal temperature TH is reduced to a value lower than or equal to the second threshold value TH2 (S14: NO).

By interrupting the printing process to reduce the target temperature of the fixing device 9, the control unit 13 can lower the temperature near the developing roller 72.

(3) In the first internal temperature calculation process of S6 and second internal temperature calculation process of S7, which are examples of the correcting in (a-2), the control unit 13 in the image-forming apparatus 1 according to the embodiment corrects the internal temperature TH to a higher value than the value calculated on the basis of the second temperature.

In this way, when the first temperature increases by a value greater than or equal to a first prescribed value compared to a value a first time ago and the absolute humidity increases by a value greater than or equal to a second prescribed value compared to a value the first time ago (S21: YES in FIG. 5), i.e., when the first temperature and absolute humidity have increased excessively in a printing process, the control unit 13 corrects the internal temperature TH to a higher value.

Therefore, the control unit 13 executes the cool-down process of S13 when the corrected internal temperature TH exceeds the first threshold value TH1 (S12: YES).

Thus, the control unit 13 can increase the frequency at which the cool-down process is executed.

(4) With the image-forming apparatus 1 according to the embodiment, the control unit 13 adds the correction value ΔR, which changes at regular intervals, to the internal temperature TH in the first internal temperature calculation process of S6 and the second internal temperature calculation process of S7.

By adding the correction value ΔR, which changes at regular intervals, the control unit 13 can gradually increase the internal temperature TH as the first temperature and absolute humidity rise.

As a result, the control unit 13 can suppress abrupt changes in calculated results for the internal temperature TH.

(5) With the image-forming apparatus 1 according to the embodiment, the control unit 13 displays a message on the display unit 14 (see FIG. 1) indicating that the installation location of the image-forming apparatus 1 is inappropriate when the current first temperature has increased by the first prescribed value or greater compared to the previous first temperature a first time ago and the current absolute humidity has increased by the second prescribed value or greater compared to the previous absolute humidity the first time ago, as described with reference to FIG. 5.

Through this process, the user can be prompted to change the installation location of the image-forming apparatus 1.

(6) With the image-forming apparatus 1 according to the embodiment, the control unit 13 displays a message on the display unit 14 indicating that the time until a cool-down process is executed will be reduced when the current first temperature has increased by the first prescribed value or greater compared to the previous first temperature a first time ago and the current absolute humidity has increased by the second prescribed value or greater compared to the previous absolute humidity the first time ago, as described with reference to FIG. 5.

In this way, the image-forming apparatus 1 can notify the user that the cool-down process will be executed with greater frequency.

In the embodiment described above, the main casing 2 is an example of the claimed main casing. The side wall 21A is an example of the claimed first side wall, and the side wall 21B is the claimed second side wall. The exhaust port 23 is an example of the claimed exhaust port. The photosensitive drum 4 is an example of the claimed photosensitive drum, and the developing roller 72 is an example of the claimed developing roller. The fixing device 9 is an example of the claimed heater. The first sensor 11 is an example of the claimed first sensor, and the second sensor 12 is an example of the claimed second sensor. The control unit 13 is an example of the claimed controller, and the display unit 14 is an example of the claimed display.

The first temperature is an example of the claimed first temperature, and the second temperature is an example of the claimed second temperature. The internal temperature TH is an example of the claimed internal temperature. The increase $\Delta T_{out}$ in the first temperature is an example of the claimed temperature increase in the first temperature, and the increase ΔH in the absolute humidity is an example of the claimed humidity increase in the absolute humidity. The first prescribed value T1 is an example of the claimed first prescribed value, and the second prescribed value H is an example of the claimed second prescribed value. The first time is an example of the claimed prescribed time. The first threshold value TH1 is an example of the claimed first threshold, and the second threshold value TH2 is an example of the claimed second threshold.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image-forming apparatus comprising:

a main casing comprising:

a first side wall having an exhaust port; and a second side wall disposed on an opposite side of the first side wall in a prescribed direction;

a photosensitive drum;

a developing roller configured to supply toner to the photosensitive drum;

a heater configured to apply heat to a sheet to which toner is transferred from the photosensitive drum to fix the transferred toner to the sheet;

a first sensor disposed near the first side wall on the same side as the exhaust port with respect to the first side wall and separated from the exhaust port, the first sensor being configured to measure a first temperature and a relative humidity;

a second sensor disposed near the second side wall and separated from the heater, the second sensor being configured to measure a second temperature; and a controller configured to perform:

(a) calculating an internal temperature on the basis of the second temperature, the internal temperature being an estimated value of a temperature near the developing roller, the calculating comprising:

when a target temperature of the heater is set to a printing temperature:

(a-1) determining whether a temperature increase in the first temperature is greater than or equal to a first prescribed value and a humidity increase in an absolute humidity is greater than or equal to a second prescribed value, the temperature increase in the first temperature indicating an amount of increase in a current first temperature relative to a previous first temperature, the current first temperature being the first temperature last measured by the first sensor, the previous first temperature being the first temperature measured by the first sensor a prescribed time before the current first temperature is measured, the absolute humidity being calculated on the basis of the relative humidity, the humidity increase in the absolute humidity indicating an amount of increase in a current absolute humidity relative to a previous absolute humidity, the current absolute humidity being based on a current relative humidity, the previous absolute humidity being based on a previous relative humidity, the current relative humidity being the relative humidity last measured by the first sensor, the previous relative humidity being the relative humidity measured by the first sensor the previous time before the timing at which the current relative humidity is measured; and (a-2) correcting, in response to determining in (a-1) that the temperature increase in the first temperature is greater than or equal to the first prescribed value and the humidity increase in the absolute humidity is greater than or equal to the second prescribed value, the internal temperature;

(b) determining whether the internal temperature is greater than a first threshold; and (c) executing, in response to determining in (b) that the internal temperature is greater than the first threshold, a cool-down process to reduce a temperature inside the main casing.

2. The image-forming apparatus according to claim 1, wherein in the cool-down process executed in (c), the controller sets the target temperature lower than the printing temperature until the internal temperature falls below a second threshold, the second threshold being lower than the first threshold.

3. The image-forming apparatus according to claim 1, wherein in the correcting in (a-2), the controller corrects the internal temperature to a higher value.

4. The image-forming apparatus according to claim 3, wherein in the correcting in (a-2), the controller adds a correction value to the internal temperature, the correction value changing at regular intervals.

5. The image-forming apparatus according to claim 1, further comprising:

a display, wherein the controller is configured to further perform:

(d) displaying, in response to determining in (a-1) that the temperature increase is greater than or equal to the first prescribed value and the humidity increase is greater than or equal to the second prescribed value, on the display a message indicating that an installation location of the image-forming apparatus is inappropriate.

6. The image-forming apparatus according to claim 1, further comprising:

a display, wherein the controller is configured to further perform:

(e) displaying, in response to determining in (a-1) that the temperature increase is greater than or equal to the first prescribed value and the humidity increase is greater than or equal to the second prescribed value, on the display a message indicating that a time until the cool-down process is executed is to be reduced.

* * * * *